Patented Jan. 13, 1948

2,434,631

UNITED STATES PATENT OFFICE 2,434,631

HYDROLYSIS OF ACETONE AUTO-CONDENSATION PRODUCTS

De Loss E. Winkler, Berkeley, and William J. Raab and Seaver A. Ballard, Oakland, Calif., assignors to Shell Development Company, San Francisco, Calif., a corporation of Delaware No Drawing. Application February 10, 1945, Serial No. 577,352

12 Claims. (Cl. 260—586)

This invention relates to a process for the hydrolysis of acetone auto-condensation products. More particularly, the invention pertains to method for effecting the conversion of xylitone and higher acetone auto-condensation products into isophorone and acetone.

Isophorone is a valuable organic compound which is manufactured in commercial quantities by auto-condensation of acetone. Numerous methods and techniques for preparing isophorone from acetone have been described. For example, U. S. Patent No. 2,183,127 shows contacting acetone vapors at 350° C. to 400° C. with calcium carbide, calcium oxide or calcium hydroxide whereby isophorone is produced. Copending application, Serial No. 474,060, filed January 28, 1943, which issued as Patent No. 2,399,976 on May 7, 1946, describes the manufacture of isophorone by continuously contacting acetone in liquid phase at 130° C. to 235° C. with a dilute aqueous solution of an alkali metal hydroxide like sodium or potassium hydroxide while continuously withdrawing the organic phase. In this method, the water formed by the reaction is extracted by the effluent organic phase and the concentration of hydroxide in the aqueous catalyst solution is maintained substantially constant. The process permits the catalyst solution to be used for indefinite periods of time with little loss of activity. Isophorone is formed from acetone in these methods by auto-condensation or chemical combination of three molecules of acetone so as to give one molecule of isophorone and two molecules of water. However, in all the methods, the formation of isophorone from acetone is not the single reaction which occurs; in fact, a multiplicity of reactions take place and this multiplicity of reactions always produces a series of related compounds. Thus the total product obtained in the auto-condensation of acetone to form isophorone contains a mixture of unreacted acetone, mesityl oxide, diacetone alcohol, isophorone, xylitone and other higher ketones of the formula $C_{15}H_{22}O$, $C_{18}H_{26}O$, $C_{21}H_{30}O$, $C_{24}H_{34}O$, etc., as well as very minor amounts of products like phorone and mesitylene. The formation of these various products other than the desired isophorone constitutes a loss of yield of isophorone and is of serious proportion in commercial application of the acetone condensation processes. The by-products mesityl oxide and diacetone alcohol are commercially valuable as such and can be separated from the total product by distillation. However, if desired, they can be isolated by fractional distillation and separately subjected to treatment whereby they are reconverted back to acetone which can be returned to the isophorone synthesis. Thus Harries, Ber. 32, 1328 (1899), describes a method for hydrolyzing mesityl oxide to acetone and Koelichen, Zeit. Physik. Chem., 33, 129 (1900), reports a method of reverting diacetone alcohol to acetone. These methods of treating the formed mesityl oxide and diacetone alcohol require a number of fractionation steps and separate treatments in order to revert the compound to acetone. A superior procedure is described in U. S. Patent No. 2,351,352. According to this method, the total product is distilled so as to obtain a fraction consisting of isophorone and lower-boiling materials and another fraction consisting of compounds higher boiling than isophorone. The crude fraction containing the isophorone and lower-boiling materials is then treated in a unitary operation so as to selectively revert substantially all of the mesityl oxide, diacetone alcohol and phorone contained therein to acetone without appreciable change of the isophorone. This procedure avoids several of the fractionation steps and improves the efficiency. Another method to avoid formation of lower-boiling by-products like mesityl oxide and diacetone alcohol, is to recirculate these compounds along with the acetone fed to the reaction system described in the above-indicated copending application whereby the reaction mixture is maintained in a steady state of chemical balance with respect to the compounds. This method is described in U. S. Patent No. 2,344,226.

While these various procedures are satisfactory for disposing of the problem of by-products lower-boiling than isophorone in methods of manufacturing isophorone from acetone, no process has been proposed which enables satisfactory disposal of the by-products which are higher-boiling than the isophorone. Such higher-boiling by-products are always obtained in appreciable quantities. For example, in producing isophorone according to the method of copending application, Serial No. 474,060, the material produced consisting of isophorone and higher-boiling by-products contains 70% to 85% isophorone, and the remaining 15% to 30% is acetone auto-condensation products which are higher boiling than the isophorone. Since the by-products of lower-boiling point than isophorone can be substantially completely reverted to acetone by the above-indicated methods, the yield of isophorone from acetone prior to the present invention was limited to about 70% to 85%.

A process has now been discovered for treating the by-product acetone auto-condensation products of higher-boiling point than isophorone so that a still higher yield of isophorone can be realized in the manufacture of this valuable compound. According to this treatment, which is the method of the present invention, the acetone auto-condensation products of higher-boiling point than isophorone are subjected in admixture with steam to a vapor phase treatment at a temperature of about 175° C. to 525° C. It was found that this treatment of the higher-boiling point by-products such as xylitone, caused the xylitone to be hydrolyzed to simpler and more useful products. Furthermore, the treatment instead of reverting the xylitone back to the parent ketone, acetone, was discovered to hydrolyze the xylitone to isophorone and acetone, and the formed isophorone did not further hydrolyze to acetone as might be expected. In other words, instead of the xylitone being hydrolyzed so that acetone was the sole end product, the treatment hydrolyzed and split the xylitone so that both isophorone and acetone were obtained as end products. The acetone can be recirculated for auto-condensation to isophorone and the isophorone formed by the hydrolysis treatment can be separated for use in a great variety of applications.

The material treated according to the process of the invention is a complex series of acetone auto-condensation products. Xylitone, having the formula $C_{12}H_{18}O$, is the first member of the series. However, as known to those skilled in the art, xylitone is not a unique and single compound; rather, several isomeric compounds are known by this name and are of the formula $C_{12}H_{18}O$. The other members of the series which are of higher molecular weight than xylitone have no recognized names, but go up the series with emperical formulas $C_{15}H_{22}O$, $C_{18}H_{26}O$, $C_{21}H_{30}O$, etc. All of these compounds, including xylitone, appear to be olefinically unsaturated ketones containing a six membered carbon ring that have the carbonyl group as one of the members of the ring. These acetone auto-condensation products are of the general formula $C_{3n}H_{4n+2}O$, wherein $n$ is an integer of at least 4.

A better understanding of the character of the material treated may be gained by consideration of the following tabulation of data secured by distillation at 10 mm. pressure of higher acetone auto-condensation products and by analysis of fractions thereof. The material had been produced by auto-condensation of acetone in liquid phase and at elevated temperature in the presence of an aqueous solution of an alkali metal hydroxide and had been given a previous distillation for removal of isophorone and lower-boiling constituents.

The acetone auto-condensation products hydrolyzed in the process of the invention include those containing from 12 to 21 carbon atoms expressed in the general formulas. These particular acetone auto-condensation products are of the formula $C_{3n}H_{4n+2}O$, wherein $n$ is an integer of 4 to 7. Preferably, the process is used for treating the acetone auto-condensation products of the formula $C_{12}H_{18}O$ and $C_{15}H_{22}O$. These materials form the bulk of the by-products higher boiling than isophorone which are produced in condensing acetone to isophorone, as will be noted from the above table. The preferred materials are treated either singly or in admixture with one another. The process is quite suitable for treating the entire by-products higher-boiling than isophorone. Regardless of the particular acetone auto-condensation product treated, it was found that isophorone and acetone are produced by the process in approximately equimolar ratios. Since the process operates in vapor phase, the hydrolysis treatment, with the quite high boiling products like $C_{18}H_{26}O$ and $C_{21}H_{30}O$, is effected under conditions at which these materials are kept in vapor phase. This may be achieved by using only small quantities of the materials in admixture with lower-boiling acetone auto-condensation products as is the case in treating the crude by-product mixture from acetone auto-condensation mixture, and by operating with a large excess of steam at the upper end of the temperature range and at approximately normal atmospheric pressure. Proper choice of conditions is easily realized to those skilled in the art for treatment of particular materials. It is only necessary that the treatment be effected in vapor phase.

The process of the invention is effected by contacting the mixture of steam and acetone auto-condensation products with a catalyst. A variety of substances display catalytic activity towards the reaction. A particularly suitable type of catalyst is one which is an extremely porous material and has a large surface area per unit weight. Adsorptive or activated aluminas have been found to be particularly suitable in the process of the invention. The activated, i. e. adsorptive, aluminas consist largely if not predominantly of alumina alpha monohydrate and/or gamma alumina, and are characterized by their highly active adsorptive properties. These activated aluminas may be prepared from the so-called "gamma" aluminas of the Haber system. Haber [Naturwiss 13, 1007 (1925)] classifies the various forms of aluminas into two systems designated by him as the "gamma" and "beta" systems depending on their behavior upon heating. The "gamma" aluminas of the Haber classification comprise gamma alumina proper and all of the

*Table I*

| Fraction | 1 | 2 | 3 | 4 | 5 |
|---|---|---|---|---|---|
| Boiling range at 10 mm., ° C | 102–112 | 112–123 | 123–142 | 142–172 | 175–6 |
| Wt. per cent of charge | 6 | 29 | 38 | 20 | |
| Refractive index (20/D) | | 1.5107 | 1.5178 | 1.5709 | |
| Specific gravity (20/4) | | 0.9284 | 0.9481 | 0.9837 | |
| Mol. wt. (Ebull. in benzene) | | 176 | 196 | 214 | |
| Mol. wt. (Theoretical) | | 178 | 198.1 | 218 | |
| Carbon, per cent | | 80.6 | 80.9 | 80.4 | |
| Hydrogen, per cent | | 10.3 | 10.3 | 10.0 | |
| Probable material | | $C_{12}H_{18}O$ | Mixture $C_{12}H_{18}O$ And $C_{15}H_{22}O$. | $C_{15}H_{22}O$ | |

[1] Assuming equivalent weights of $C_{12}H_{18}O$ and $C_{15}H_{22}O$.

so-called hydrated aluminas which, upon heating, are converted to alpha alumina through the gamma form. On the other hand, the "beta" aluminas of the Haber system of classification comprise those aluminas such as diaspore which upon heating are converted directly to alpha aluminas without going through the gamma form. The classification of aluminas into the two systems designated as "gamma" and "beta" systems according to Haber is not to be confused with the fundamental true alumina forms. This classification is merely for the purpose of dividing the common forms of alumina into two distinct groups. Thus, the various so-called hydrated aluminas which are classified as belonging to the "gamma" system in the Haber classification are totally distinct from the true gamma alumina, and diaspore is not a beta alumina.

The aluminas which upon heating are converted into alpha alumina through gamma alumina, which belong to the "gamma" system of the Haber classification, and which thus comprise or form the activated or adsorptive aluminas referred to hereinabove and in the appended claims, are:

1. The alumina alpha trihydrate, known as gibbsite or hydrargillite; this form is readily prepared synthetically and occurs in nature in the mineral, gibbsite, and as a component of certain bauxites;

2. The alumina beta trihydrate, known also as bayerite; it is isomorphous with hydrargillite; it does not occur naturally, but may be prepared synthetically by proper control of the precipitation conditions;

3. The alumina alpha monohydrate, known as böhmite, which is formed by the partial dehydration of either of the above two trihydrates;

4. Gamma alumina, which is a meta-stable anhydrous oxide, and which, although it does not occur naturally, may be prepared by carefully controlled dehydration of any of the first three mentioned hydrates;

5. Gelatinous aluminum hydroxide. This frequently encountered alumina is amorphous when freshly precipitated, but after aging the characteristic lines of böhmite can be detected by X-ray analysis. On further aging, the precipitate is gradually transformed to bayerite and finally to hydrargillite;

6. Bauxite, which is an ore of varied composition. The term "bauxite" was used in the older literature to designate the dihydrate; however, it is now known that bauxite consists of an extremely finely divided mixture of two or more of the known aluminas and certain argillaceous residues, and that no dihydrates of aluminas have ever been observed.

The physical, chemical and even the catalytic properties of the above and other adsorptive aluminas may vary within relatively wide limits depending on small variations in the processes and methods used in their preparation. A preferred type of activated or adsorptive alumina is prepared by dehydration of alumina trihydrate crystallized from alkali aluminate solutions. Of this type, a particularly suitable material is that prepared from massive alumina trihydrate, as for example the material described in U. S. Patents 1,868,869 and 2,015,593. Natural aluminas, such as bauxite, are generally not so efficient as the preferred synthetic aluminas due largely to the presence of appreciable percentages of iron, silica impurities, etc., which usually decrease their selectivity and increase cracking. However, certain selected bauxites, such as bauxite activated by careful calcination, approach in efficiency the above preferred aluminas, and may be advantageously employed or even preferred as a catalyst in the present process in view of the considerably lower cost of such bauxites.

The various hydrated aluminas described above may be dehydrated, i. e. activated, to any desired extent. The maximum adsorptive capacity usually corresponds to a water content of between about 7% and about 12%. These materials are very suitable. However, it is found that the various aluminas may be rendered even more suitable by further dehydration to a water content of below about 6% in which case the aluminas exist predominantly in the form of the above described gamma alumina. These aluminas have large surface areas which may range from about 8 square meters per gram up to about 400 square meters per gram.

The catalyst may be employed in any desirable or suitable form as, for example, in the form of granules, pellets, powders, etc., of any workable size. In using the catalyst in executing the process of the invention, the catalytic material in form of particles or granules in the desired size is packed preferably into a suitable reaction tube or chamber. The catalytic material is maintained in the desired operating temperature by suitable external heating means and vapors of the acetone auto-condensation product in admixture with steam is passed over and through the catalyst mass at a suitable and preferably optimum space velocity. The term "space velocity" as employed herein is the number of mols of acetone auto-condensation product contacted with a liter of the catalyst or reaction space per hour. After passage through the catalyst, the reaction mixture is condensed and subjected to known recovery and separation methods, such as distillation, for the purpose of separating the formed acetone, isophorone and other products from the unreacted material.

For the purpose of illustrating a manner of executing the process of the invention the following specific example is given:

The materials subjected to the conversion consisted of a mixture of about equal volumes of fractions 2 and 3, described in Table I. The catalyst was a 8–14 mesh adsorptive alumina which predominated in alumina alpha monhydrate prepared by partial dehydration of alumina trihydrate obtained by slow precipitation from a sodium aluminate solution. This alumina is commercially available. For convenience in the present specification, it will be designated as adsorptive alumina-A. The reactor was a seamless iron tube in which about 110 cc. of space was filled with catalyst particles and the portion of the tube ahead of the catalyst was filled with iron gauze to act as preheater. The effluent from the reactor was passed through a water-cooled condenser and the remaining gases through a dry ice cooled tube and then through a wet meter. The product was salted out from the water, separated and distilled.

The catalyst was maintained at about 300° C. and a space velocity of about 9.5 mols per liter of catalyst per hour was used with a mol ratio of steam to ketone feed of 10.6:1. A total of 919 grams of the feed was contacted with the catalyst while 908 grams of liquid product was recovered along with 0.145 mols of gas. Upon distillation, the liquid product was found to be of the following composition:

Table II

| Material | Weight, Per Cent |
|---|---|
| Acetone | 3.5 |
| Intermediate cut | 1.5 |
| Isophorone | 10.3 |
| Xylitone and $C_{15}H_{22}O$ | 77.8 |
| 285° Ketone | 2.2 |
| Bottoms | 4.5 |

The isophorone produced amounted to 0.68 mols and 0.55 mols of acetone was obtained. The conversion to isophorone was 13.9% with a yield of about 60%.

A new ketone was produced by the process and is labled as the 285° Ketone in the above table. This ketone may be obtained from the acetone condensation product of the formula $C_{15}H_{22}O$ by the demethanation reaction: $C_{15}H_{22}O \rightarrow C_{14}H_{18}O + CH_4$. The 285° Ketone upon recovery from the crude product of the process is a liquid material containing some other substances. By dissolving the liquid 285° Ketone fraction in octanes, the 285° Ketone can be obtained as a pure crystalline solid upon crystallization. The amounts of impurities associated with the 285° Ketone in the 285° Ketone fraction are very small, and consequently the amount of this substance obtained in the various experiments reported in this application are given in terms of volume, since in the majority of cases the crystalline compound was not separated from the impurities. The purified 285° Ketone is a white crystalline material melting at 54.5–55° C. on an aluminum block. It boils at about 285° C. under 760 mm. or at 163° C. under 20 mm. pressure. Its 2,4-dinitrophenyl hydrazone melts at 238° C. An analysis showed the ketone to contain 83.2% carbon and 8.99% hydrogen; molecular weight slightly above 200; carbonyl value 0.313 equiv. per 100 grams; and a bromine number of about 1.3 grams $Br_2$ per 100 grams. This analysis indicated the 285° Ketone had an empirical formula of $C_{14}H_{18}O$. The probable structural formula is as follows:

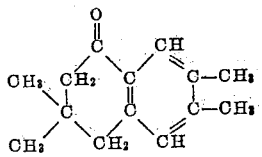

This ketone is of value as an insecticide, larvacide, and fungicide; as a plasticizer for synthetic resins; and as a intermediate chemical for synthesis of dyes and other valuable chemical compounds.

In executing the process of the invention, an operating temperature of about 175° C. to 525° C. is suitable. With a preferred catalyst like adsorptive alumina, good results are obtained at a temperature in the neighborhood of 200° C. In general, operation from 200° C. to 400° C. gives increasing conversion of the acetone auto-condensation products to isophorone with increasing temperature. However, the yield of isophorone is greatest at the lower end of this temperature range and tends to decrease with increasing temperature. The preferred temperature of operation which gives best results in obtaining isophorone and acetone from the acetone auto-condensation products, is accordingly from about 200° C. to 300° C.

When the acetone auto-condensation products subjected to treatment is the ketone of the formula $C_{15}H_{22}O$, or contains appreciable amounts of this substance, it was found that the demethanation reaction, producing the 285° Ketone $C_{14}H_{18}O$, was favored at increasing temperature. Formation of this product is most favored in the temperature range of about 400° C. to 500° C. However, it was found that operation at temperatures of 400° C. or higher, produced another product which was particularly favored when a highly active catalyst like adsorptive alumina was used. This product was 3,5-xylenol which was apparently produced by the acetone auto-condensation products being first hydrolyzed to isophorone and then the formed isophorone is demethanated with rearrangement so that the 3,5-xylenol is produced. This phenol is obtained in appreciable quantities when the process is operated at the upper 100 degrees of the temperature range.

The effect of temperature on the process will be more evident from results tabulated below in which temperature was the sole variable. The catalyst was of the same type as used in the aforementioned experiment, namely adsorptive alumina-A. The acetone auto-condensation product which was treated was that designated as Fraction 3 in Table I. In each run, 490 cc. was subjected to treatment. A space velocity of 9 was used with a mol ratio of steam to ketone feed of 11.1:1.

Table III

| Temperature | Conversion to Isophorone | Yield of Isophorone | Cc. of 285° Ketone |
|---|---|---|---|
|  | Per cent | Per cent |  |
| 200° C | 19.5 | 65 | 18 |
| 300° C | 20.9 | 58 |  |
| 400° C | 25.2 | 36 | 124 |

The space velocity at which the process is operated can be varied over considerable limits. Space velocities of from about 1 to 50 or even higher are suitable. The choice of space velocities will be governed to some extent by the temperature of operation. When a low space velocity is used, the temperature should not be so high that the residence time of the reactant end products are conducive to substantial decomposition of the materials. Also, with low temperatures and very high space velocities, the residence time is so short that virtually no reaction may occur. In general, a space velocity of about 5 to 20 is preferred and operation in the neighborhood of about 10 is particularly suitable. In the present application, while both ketone reactant and steam are used for feed to the process, reference to space velocity is measured solely with respect to the ketone reactant.

The mol ratio of steam to ketone reactant can also be varied to considerable extent. The amount of steam should be, in general, at least equal, on a mol basis, to the ketone reactant. A suitable mol ratio of steam to ketone is from about 2:1 to 25:1, although a ratio of 5:1 to 15:1 is preferred. Because the process is operated in vapor phase, the mol ratio of steam to ketone is substantially the same as the ratio of volumes of steam to volumes of vaporous ketone during contact with the catalyst. Since the reaction is effected by passing the ketone reactant in contact with the catalyst in vapor phase, it is necessary, especially with the more complex and very high boiling acetone autocondensation products, to use a steam ratio sufficiently high so the ketone will be in vapor phase. The use of steam in the method is of course essential because the hydrolysis reaction does not occur without it. Thus, when xylitone is converted to isophorone, the steam reacts with the xylitone so that isophorone and acetone are formed. Steam is accordingly added to the ketone for passage over the catalyst in the process of the invention.

Effecting the reaction in vapor phase makes necessary the use of pressures which are not inordinately high. In general, a pressure not greater than about 3 atmospheres is used and usually it is preferred to operate at about normal atmospheric pressure. Subatmospheric pressures can be used as between 0.1 and 1 atmospheres, but such low pressures do not permit most efficient use of the equipment, so are generally not preferred. With operation at the atmospheric pressure prevailing in the locality where the process is executed, a somewhat higher pressure than atmospheric is needed at the inlet of the reaction zone in order to force the reactants through the catalyst bed. The higher pressure is needed, as is well known, to take care of the pressure drop which occurs because of resistance to passage of the reactant mixture through the catalyst bed. This will be most marked with operation at higher space velocities.

Some results with varied space velocities and mol ratios of steam to ketone reactant are tabulated below. The catalyst was adsorptive alumina-A and the ketone was Fraction 3, described in Table I. In each run, 490 cc. of ketone was passed through the catalyst.

Table IV

| Temperature | Space Velocity | Steam to Ketone Ratio | Conversion to Isophorone | Yield of Isophorone | Cc. of 285° Ketone |
|---|---|---|---|---|---|
| | | | Per cent | Per cent | |
| 300° C | 4.5 | 22.2 | 24.7 | 60 | |
| 300° C | 9.0 | 11.1 | 20.9 | 58 | 40 |
| 300 | 18.0 | 5.6 | 14.9 | 60 | 4 |
| 500 | 9.0 | 2.8 | 4.6 | 8 | 100 |

Excellent results are obtained with certain forms of adsorptive aluminas which constitute the preferred class of catalysts. This will be evident from the results tabulated below wherein Fraction 3, described in Table I, was used in an amount of 490 cc. for each run. The space velocity was 9 in each case. In the table, the catalyst designated as alumina alpha monohydrate was adsorptive alumina-A prepared as described hereinbefore. The activated bauxite is a specially activated bauxite, the activation being effected by careful calcination of a natural, high grade bauxite so as to obtain a material high in alumina alpha monohydrate. The gamma alumina had been prepared by first crystallizing alumina trihydrate from a sodium aluminate solution and then calcining the alumina trihydrate until gamma alumina forms. Each of these adsorptive aluminas had a high surface area, that of adsorptive alumina-A being about 270–300 square meters per gram, that of the activated bauxite being about 160–180 square meters per gram, and that of the gamma alumina being about 90–100 square meters per gram.

Table V

| Catalyst | Temperature | Steam to Ketone Ratio | Conversion to Isophorone | Yield of Isophorone | Cc. of 285° Ketone |
|---|---|---|---|---|---|
| | °C. | | Per cent | Per cent | |
| Alumina Alpha Monohydrate | 300 | 11.1 | 20.9 | 58 | |
| Activated Bauxite | 300 | 11.1 | 14.0 | 54 | 16 |
| Gamma Alumina | 300 | 11.1 | 18.4 | 60 | 23 |
| Alumina Alpha Monohydrate | 500 | 2.8 | 4.6 | 8 | 100 |
| Activated Bauxite | 500 | 2.8 | 5.1 | 8 | 120 |

The adsorptive aluminas as well as other catalytic materials can have various metals or metal compounds incorporated with the catalytic base for the purpose of improving the catalytic activity. Thus, with the adsorptive aluminas like alumina alpha monohydrate or gamma alumina, metallic copper or nickel can be mounted on or in the catalyst whereby some improvement in catalytic activity is realized. Likewise, metallic copper or nickel can be mounted on activated bauxite. When a metal is desired to be mounted on the catalyst, the catalyst is soaked in a solution of a salt of the metal, dried, and heated to decompose the metal salt. The free metallic form of the metal is then obtained by treating the dried catalyst with hydrogen at 400–500° C. whereby reduction of the metal compound occurs.

To exemplify the effect of metallic promoters, the results from certain experiments are given in the table below. The catalysts used in the tabulation were prepared as follows:

Copper was mounted on alumina alpha monohydrate by first pouring about 400 cc. of aqueous solution containing 60 grams of $CuCl_2$ and 5 cc. of concentrated HCl onto 400 grams of 8–14 mesh alumina alpha monohydrate and frequently stirring the mixture for about 15 minutes. The catalyst was filtered from the solution and dried at 120° C. to 130° C. for about 2 hours. The catalyst was then packed into the reaction tube and reduced with hydrogen at 400–500° C. until hydrogen chloride ceased to be evolved. A catalyst having $CuCl_2$ mounted on alumina alpha monohydrate was prepared in the same manner except that the step of reducing with hydrogen was omitted.

Nickel was mounted on alumina alpha monohydrate by adding 300 grams of 8–14 mesh alumina alpha monohydrate to 150 cc. of solution containing 89 grams of $Ni(NO_3)_2 \cdot 6H_2O$. The mixture stood for 15 minutes with frequent stirring, after which the catalyst was filtered from the solution, dried and the nickel salt decomposed by heating at 500 to 600° C. The catalyst was then placed in the reaction tube and reduced for about an hour with hydrogen at 400–500° C.

The reactant used in the experiments represented below was again 490 cc. of Fraction 3, described in Table I. In each experiment, the space velocity was 9. For purposes of comparison, the table lists results under comparable conditions with catalysts having no metal activator or promoter mounted on them.

*Table VI*

| Promoter | Temperature | Steam to Ketone Ratio | Conversion to Isophorone | Yield of Isophorone | Cc. of 285° Ketone |
|---|---|---|---|---|---|
| | °C. | | Per cent | Per cent | |
| None | 200 | 11.1 | 19.5 | 65 | 18 |
| Cu | 200 | 11.1 | 12.6 | 63 | |
| None | 300 | 11.1 | 20.9 | 58 | |
| Cu | 300 | 11.1 | 22.2 | 51 | |
| None | 400 | 11.1 | 25.2 | 36 | 124 |
| Cu | 400 | 11.1 | 25.3 | 31 | |
| Cu | 400 | 2.8 | 15.2 | 20 | 156 |
| Ni | 400 | 2.8 | 16.0 | 23 | 154 |
| CuCl₂ | 400 | 2.8 | 16.7 | 22 | 143 |
| Cu | 500 | 11.1 | 12.9 | 16 | 130 |

Various metal oxides are also suitable as promoters for the catalytic materials. This will be evident from results given in the table below. The catalyst containing iron oxide mounted on alumina alpha monohydrate was obtained by soaking the alumina in an aqueous solution of ferric chloride after which the impregnated material was treated with an aqueous solution of sodium hydroxide and/or sodium carbonate and then dried at 120° C. The catalyst contained about 5.7% iron.

The catalyst containing the chromic oxide as promoter was prepared by adding 400 grams of 8-14 mesh alumina alpha monohydrate to 200 cc. of aqueous solution containing 57.8 grams of $CrO_3$. All the solution was adsorbed and the catalyst was then dried for about 6 hours at 120° C.

The catalysts were tested by passing 490 cc. of Fraction 3, described in Table I, over the catalysts at a space velocity of 9. The results obtained are given in the following table:

*Table VII*

| Promoter | Temperature | Steam to Ketone Ratio | Conversion to Isophorone | Yield of Isophorone | Cc. of 285° Ketone |
|---|---|---|---|---|---|
| | °C. | | Per cent | Per cent | |
| None | 400 | 11.1 | 25.2 | 36 | 124 |
| Fe₂O₃ | 400 | 11.1 | 11.5 | 17 | 108 |
| CrO₃ | 400 | 11.1 | 24.0 | 31 | 126 |
| None | 500 | 2.8 | 4.6 | 8 | 100 |
| Fe₂O₃ | 500 | 2.8 | 7.5 | 11 | 160 |

While preferred catalyst consisting predominantly of alumina have been described above, a variety of solid inorganic substances are also effective in catalyzing the reaction. For this purpose various calcined clays and siliceous earths like kieselguhr, diatomaceous earth, infusorial earth, Tripoli, etc., can be used, as well as pumice, the zeolites, bentonite and the like. In general, good results are obtained with porous and adsorptive siliceous materials. Synthetic catalysts are also suitable such as alumina silicate and calcined materials comprising calcined silica and/or alumina gels. Solid alkaline materials like lime, calcium oxide or soda lime can be used. If desired, various promoters, such as metals like Cu, Ni, Mn, or Fe, as well as their compounds like the oxides or chlorides, can be mounted or admixed with the solid catalytic materials.

Results with a variety of such catalytic materials are illustrated in the table below. A few words can first be said concerning the preparation and character of these catalysts.

A catalyst consisting of copper mounted on pumice was prepared by adding 300 cc. of aqueous solution containing 100 grams of CuCl₂ to 200 grams of 6-14 mesh pumice. The mixture was stirred frequently for 15 minutes, filtered and dried at about 120° C. to 130° C. The CuCl₂ was reduced by treating with hydrogen at 400-500° C.

Copper was mounted on bauxite, which had been activated by careful calcination, by adding 80 cc. of aqueous solution containing 15 grams of CuCl₂ and 2 cc. of concentrated HCl to 125 grams of 8-14 mesh activated bauxite. The mixture was stirred about 30 minutes, filtered, dried and the copper compound reduced with hydrogen.

A solid catalyst designed primarily for cracking hydrocarbons is listed in the table as "Silica-alumina-zirconia." It is a composite of these substances and was made by dehydrating the hydrogels (see U. S. 2,278,746 and 2,280,650).

A solid catalyst designated as "H₃PO₄ on kieselguhr" was an olefin polymerization catalyst consisting of phosphoric acid mounted on kieselguhr. See U. S. 1,993,593 for its preparation.

The soda lime used consisted of about 90% CaO and 10% NaOH. Copper was mounted on soda lime by adding 200 cc. of an aqueous solution made from 30 grams of CuCl₂ and 25 cc. of concentrated HCl to 150 grams of soda lime granules. The mixture stood about 5 minutes, was washed twice by decantation, filtered and dried. The copper compound contained on the lime was reduced with hydrogen at 400-500° C.

The feed was the same mixture of xylitone and $C_{15}H_{22}O$ used in the experiments described hereinbefore, namely, Fraction 3 listed in Table I, and amounted to 490 cc. in each run. A space velocity of 9 was used in each case. For purposes of comparison, results from experiments previously described are given, and to save space, alumina alpha monohydrate is given under the designation AAM in the table.

*Table VIII*

| Catalyst | Temperature | Steam to Ketone Ratio | Conversion to Isophorone | Yield of Isophorone | Cc. of 285° Ketone |
|---|---|---|---|---|---|
| | °C. | | Per cent | Per cent | |
| AAM | 300 | 11.1 | 20.9 | 58 | |
| H₃PO₄ on kieselguhr | 300 | 11.1 | 6.3 | 9 | 100 |
| Activated bauxite | 300 | 11.1 | 14.0 | 45 | 16 |
| Cu on activated bauxite | 300 | 11.1 | 11.1 | | |
| AAM | 400 | 11.1 | 25.2 | 36 | 124 |
| Silica-alumina-zirconia | 400 | 11.1 | 3.5 | | 122 |
| H₃PO₄ on kieselguhr | 400 | 2.8 | 2.9 | | 100 |
| Cu on AAM | 400 | 2.8 | 15.2 | 20 | 156 |
| Cu on soda lime | 400 | 2.8 | 6.9 | 21 | 68 |
| AAM | 500 | 2.8 | 4.6 | 8 | 100 |
| Soda lime | 500 | 2.8 | 6.9 | 11 | 142 |
| Cu on AAM | 500 | 2.8 | 6.3 | 10 | 128 |
| Cu on pumice | 500 | 2.8 | 6.6 | 22 | 38 |

When used in the process of the invention, the catalysts gradually lose activity, and in time, it becomes desirable to regenerate them so the activity is regained. The loss in activity appears to be due to deposits on and in the solid catalysts of polymer-like substances and some carbon. This carbon-containing material is removed by oxidizing or burning off the deposits. The regeneration treatment is effected, preferably at a temperature not materially in excess of 700° C., with air or oxygen, either of which may be in admixture with other inert gases such as nitrogen, helium or carbon dioxide. The regeneration can be carried out without removal of the spent catalyst from the reaction tube or chamber. In regenerating the catalyst, the oxidizing gas is conveyed over the spent catalyst which is maintained at least at ignition temperature and, by regulating the proportion of molecular oxygen to inert gas, the temperature of oxidation is maintained at a desired point which is usually from about 650 to 700° C. The time of treatment needed to remove the deposit from the catalyst will depend on various factors, e. g. the amount of deposit on the catalyst, the space velocity of oxidizing gas used, the proportion of oxygen contained in the oxidizing gas, etc.

The decline in activity of a catalyst and its regeneration may be illustrated by results obtained when a catalyst predominating in alumina alpha monohydrate was used. The ketone feed was Fraction 3, described in Table I. About 490 cc. of the feed was conveyed over the catalyst at a temperature of 300° C. at a space velocity of 9. A mol ratio of steam to ketone of 11.1 was used. The run gave a conversion of 20.9% to isophorone with a yield of about 58%. A second 490 cc. of ketone feed was then passed over the catalyst which had not been regenerated but was used under identical reaction conditions a second time to observe the decline in activity. The conversion for the second period dropped to 9.8% although the yield was 53%. The catalyst was then regenerated by burning off the deposit thereon with a mixture of air and nitrogen at about 700° C. The regenerated catalyst was then used to hydrolyze a third quantity of 490 cc. of the ketone feed under the same reaction conditions as used in the first two runs. It was found that the activity of the catalyst after the regeneration treatment was somewhat better than the fresh catalyst since a conversion to isophorone of 21.8% was obtained at a yield of about 60%.

Since the regeneration of the catalyst involves an oxidation treatment, those catalysts containing a promoter which is a metal in free metallic state, are less preferred for use in the process. The regeneration with the oxidizing gas will ordinarily also oxidize the metal promoter and in order to return it to the free metallic state, a reduction treatment is necessary. Thus, when a catalyst of this character is employed, such as copper mounted on alumina alpha monohydrate, the cycle of operations which are used is (1) contacting the mixture of steam and acetone auto-condensation products with the catalyst, (2) removal of deposits on the catalyst by contacting it with the oxidizing gas, and (3) a reduction of the oxidized promoter with hydrogen at 400–500° C., after which the catalyst is again ready for reuse to treat the ketones. When the promoter is not a free metal, the third step in the above cycle can be omitted and accordingly this type of a catalyst is preferred.

The process of the invention is applied to treatment of acetone auto-condensation products of higher-boiling point than isophorone. The material treated is preferably xylitone and acetone auto-condensation products of higher-boiling point than xylitone, which material is substantially free of isophorone as well as ketones lower boiling than isophorone, e. g. actone, mesityl oxide, diacetone alcohol, and phorone. By substantially free is meant that the material contains no more than about 10% of isophorone and still lower boiling ketones.

While the experiments reported hereinbefore involved treatment of acetone auto-condensation products consisting of mixtures of compounds containing different numbers of carbon atoms, i. e. mixtures of xylitone and the ketone $C_{15}H_{22}O$, the process of the invention can be used for treatment of ketones which contain only a single number of carbon atoms. Below are results obtained with such ketones whereby isophorone was obtained both from xylitone alone and from the ketone $C_{15}H_{22}O$ alone. In each run 490 cc. of ketone was used. Since the 285° Ketone is formed by demethanation of the $C_{15}H_{22}O$ ketone, none of the 285° Ketone was obtained when xylitone alone was used as feed. In the experiments tabulated below, the catalysts were prepared as described hereinbefore and to save space, adsorptive alumina predominating in alumina alpha monohydrate (adsorptive alumina-A) is designated by the symbol AAM.

Table IX

| Catalyst | Feed | Temp. | Space Velocity | Steam to Ketone Ratio | Conversion to Isophorone | Yield of Isophorone | Cc. of 285° Ketone |
|---|---|---|---|---|---|---|---|
| | | °C. | | | Per cent | Per cent | |
| AAM | $C_{12}H_{18}O$ | 300 | 10 | 10 | 15.5 | 58 | None |
| CuCl$_2$ on AAM | $C_{12}H_{18}O$ | 400 | 10 | 2.5 | 13.4 | 26 | None |
| Soda Lime | $C_{12}H_{18}O$ | 500 | 10 | 2.5 | 6.4 | 15 | None |
| AAM | $C_{15}H_{22}O$ | 300 | 8 | 12 | 18.6 | | 135 |

Treatment of other higher boiling acetone auto-condensation products than xylitone and the ketone $C_{15}H_{22}O$, such as the ketones $C_{18}H_{26}O$ and $C_{21}H_{30}O$, also give isophorone when admixed with steam and passed over the catalysts either alone, in admixture with one another, or in admixture with xylitone and/or the ketone $C_{15}H_{22}O$.

The passage of the acetone auto-condensation products over the catalyst does not effect complete hydrolysis in a single treatment; rather, a portion of the material treated goes through the reaction zone unchanged. This portion can be recovered from the product of treatment by distillation and recycled for additional treatments whereupon further hydrolysis occurs. Further treatment of once-treated material gave similar results to those obtained upon the first treatment. This embodiment of the invention was demonstrated in the following manner. The catalyst consisting of 8–14 mesh alumina alpha monohydrate (adsorptive alumina-A) and an operating temperature of 300° C. was used. The feed in amount of 919 grams was a mixture of about equal volumes of Fractions 2 and 3, described in Table I. A space velocity of 9.5 with a mol ratio of steam to ketone of about 10.6:1 was used. The treatment gave a conversion to isophorone of 13.9% with a yield of 60%. The recovered crude product was fractionated so as to separate the unconverted material. About 490 cc. of this material was then again passed over fresh catalyst (adsorptive alumina-A) under identical conditions. The second passage gave a conversion to isophorone of 11.7: with a yield of 55%.

We claim as our invention:

1. A process of hydrolysis which comprises contacting a mixture of vapors of acetone auto-condensation products of higher boiling point than isophorone and at least an equal volume of added steam, with an adsorptive alumina catalyst at a temperature of 175 to 525° C.

2. A process of producing ketones of lower molecular weight from acetone auto-condensation products of higher boiling point than isophorone which comprises conveying vapors of said auto-condensation products with at least an equal volume of added steam into contact with an adsorptive alumina catalyst at 175 to 525° C. under a pressure not greater than about 3 atmospheres.

3. A process for catalytic hydrolysis of acetone auto-condensation products containing 12 to 21 carbon atoms which comprises conveying vapor of said condensation products and at least an equal volume of added steam into contact with an adsorptive alumina catalyst at a space velocity of 1 to 50 measured with respect to said condensation products at a temperature of 175 to 525° C.

4. A process for catalytic hydrolysis of acetone auto-condensation products of higher boiling point than isophorone which comprises conveying a mixture of vapor of said condensation products and 2 to 25 volumes of added steam into contact with an adsorptive alumina at a space velocity of 5 to 20 measured with respect to said condensation products at a temperature of about 200 to 400° C.

5. A process for catalytic hydrolysis of acetone auto-condensation products of the formula $C_{3n}H_{4n+2}O$ wherein $n$ is an integer of 4 to 7 which comprises conveying a mixture of vapor of said condensation products and at least an equal volume of added steam into contact with an adsorptive alumina catalyst at a space velocity of 1 to 50 measured with respect to said condensation products at a temperature of 175 to 525° C., and subsequently regenerating the catalyst by burning off carbon-containing deposits from the catalyst with gas containing molecular oxygen.

6. A process for catalytic formation of isophorone and acetone from an acetone auto-condensation product of the formula $C_{3n}H_{4n+2}O$ wherein $n$ is an integer of 4 to 7 which comprises conveying a mixture of vapor of said condensation product and 2 to 25 volumes of added steam into contact with adsorptive alumina predominating in alumina alpha monohydrate at a space velocity of 5 to 20 measured with respect to said condensation product at a temperature of about 200 to 400° C.

7. A process for catalytic formation of isophorone and acetone from an acetone auto-condensation product of the formula $C_{3n}H_{4n+2}O$ wherein $n$ is an integer of 4 to 7 which comprises conveying a mixture of vapor of said condensation product and 2 to 25 volumes of added steam into contact with adsorptive alumina predominating in gamma alumina at a space velocity of 5 to 20 measured with respect to said condensation product at a temperature of about 200 to 400° C.

8. A process for production of isophorone from an acetone auto-condensation product containing 12 to 15 carbon atoms which comprises maintaining a catalyst comprising adsorptive alumina predominating in alumina alpha monohydrate at a temperature of about 200 to 300° C., and conveying vapor of said condensation product in admixture with a mol ratio of 2:1 to 25:1 of steam to said condensation product in contact with said catalyst at a space velocity of 5 to 20 measured with respect to said condensation product.

9. A process for production of isophorone from an acetone auto-condensation product containing 12 to 15 carbon atoms which comprises maintaining a catalyst comprising adsorptive alumina predominating in gamma alumina at a temperature of about 200 to 300° C., and conveying vapor of said condensation product in admixture with a mol ratio of 2:1 to 25:1 of steam to said condensation product in contact with said catalyst at a space velocity of 5 to 20 measured with respect to said condensation product.

10. A process for the hydrolysis of xylitone so as to form isophorone and acetone which comprises conveying a mixture of vapor of xylitone and 5 to 15 volumes of added steam into contact with a catalyst comprising adsorptive alumina predominating in alumina alpha monohydrate at a space velocity of 5 to 20 measured with respect to the xylitone and at a temperature of 200 to 300° C. under a pressure of less than about 3 atmospheres.

11. A process for the hydrolysis of xylitone so as to form isophorone and acetone which comprises conveying a mixture of vapor of xylitone and 5 to 15 volumes of added steam into contact with a catalyst comprising adsorptive alumina predominating in gamma alumina at a space velocity of 5 to 20 measured with respect to the xylitone and at a temperature of 200 to 300° C. under a pressure of less than about 3 atmospheres.

12. A crystalline ketone of the empirical formula $C_{14}H_{18}O$ which boils at about 285° C. under 760 mm. pressure and at about 163° C. under 20 mm. pressure, which melts at about 54.5 to 55° C., which forms a 2,4-dinitrophenyl hydrazone melting at about 238° C. and which has the probable structural formula:

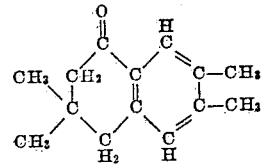

DE LOSS E. WINKLER.
WILLIAM J. RAAB.
SEAVER A. BALLARD.

REFERENCES CITED

The following references are of record in the file of this patent:

UNITED STATES PATENTS

| Number | Name | Date |
|---|---|---|
| 2,148,103 | Bruson | Feb. 21, 1939 |
| 2,183,127 | Vaughn | Dec. 12, 1939 |